(12) United States Patent
Cherkasov et al.

(10) Patent No.: US 11,108,802 B2
(45) Date of Patent: Aug. 31, 2021

(54) METHOD OF AND SYSTEM FOR IDENTIFYING ABNORMAL SITE VISITS

(71) Applicant: YANDEX EUROPE AG, Lucerne (CH)

(72) Inventors: Dmitry Aleksandrovich Cherkasov, Yaroslavl (RU); Alexander Vladimirovich Anisimov, Zhukovskiy (RU); Grigory Mikhailovich Gankin, Samara (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 16/869,282

(22) Filed: May 7, 2020

(65) Prior Publication Data

US 2021/0075809 A1  Mar. 11, 2021

(30) Foreign Application Priority Data

Sep. 5, 2019 (RU) .......................... RU2019128025

(51) Int. Cl.

| | |
|---|---|
| *H04L 29/06* | (2006.01) |
| *G06K 9/62* | (2006.01) |
| *H04L 29/08* | (2006.01) |
| *G06F 16/951* | (2019.01) |
| *G06F 16/95* | (2019.01) |

(52) U.S. Cl.
CPC .......... *H04L 63/1425* (2013.01); *G06F 16/95* (2019.01); *G06F 16/951* (2019.01); *G06K 9/6224* (2013.01); *H04L 67/22* (2013.01)

(58) Field of Classification Search
CPC ...... G06F 16/95; G06F 16/951; G06F 16/285; G06F 16/28; G06F 11/3452; G06F 21/52; G06F 3/04842; G06K 9/6224; H04L 63/1425; H04L 63/1416; H04L 63/168; H04L 63/20; H04L 67/22; G06Q 10/06313; G06Q 10/067; G06Q 30/04
See application file for complete search history.

(56) References Cited

U.S. PATENT DOCUMENTS

| | | |
|---|---|---|
| 7,519,562 B1 | 4/2009 | Vander et al. |
| 7,610,276 B2 | 10/2009 | Yomtobian |
| | (Continued) | |

FOREIGN PATENT DOCUMENTS

CN   103853744 A   6/2014

OTHER PUBLICATIONS

"Search Engine Click Spam Detection Based on Bipartite Graph Propagation" http://www.thuir.cn/group/-YQLiu/publications/wsdm2014.pdf, published in WSDM'14 Proceedings of the 7th ACM international conference on Web search and data mining on Feb. 24, 2014, retrieved on Oct. 9, 2019.

(Continued)

*Primary Examiner* — Le H Luu
(74) *Attorney, Agent, or Firm* — BCF LLP

(57) ABSTRACT

There is disclosed a method and system for determining web hosts receiving abnormal site visits. The method comprises generating a graph of web search history and clustering nodes in the graph. The method then comprises removing clusters that are affiliated based on user interaction data, and storing indicators that the remaining web hosts are associated with abnormal site visits.

20 Claims, 10 Drawing Sheets

(56) References Cited

U.S. PATENT DOCUMENTS

| | | | |
|---|---|---|---|
| 7,827,054 B2 | 11/2010 | Campbell et al. | |
| 7,877,800 B1 | 1/2011 | Satish et al. | |
| 8,578,462 B2 | 11/2013 | Petrovic | |
| 8,661,299 B1 | 2/2014 | Ip | |
| 8,966,631 B2 | 2/2015 | El-Moussa et al. | |
| 9,047,628 B2 | 6/2015 | Mislove et al. | |
| 9,092,510 B1 | 7/2015 | Stets et al. | |
| 9,183,387 B1 | 11/2015 | Altman et al. | |
| 9,241,010 B1 | 1/2016 | Bennett et al. | |
| 9,349,134 B1 | 5/2016 | Adams et al. | |
| 9,479,516 B2 | 10/2016 | Mote et al. | |
| 9,652,354 B2 | 5/2017 | Filimonov et al. | |
| 9,672,242 B2 | 6/2017 | Jung et al. | |
| 9,846,896 B2 | 12/2017 | Shah et al. | |
| 9,866,566 B2 | 1/2018 | Dulkin et al. | |
| 9,870,596 B2 | 1/2018 | Babinowich et al. | |
| 10,009,358 B1 | 6/2018 | Xie et al. | |
| 10,084,816 B2 | 9/2018 | Zhang et al. | |
| 10,089,660 B2 | 10/2018 | Luan et al. | |
| 10,218,733 B1 | 2/2019 | Amidon et al. | |
| 2005/0262026 A1 | 11/2005 | Watkins et al. | |
| 2008/0162475 A1 | 7/2008 | Meggs et al. | |
| 2008/0172271 A1 | 7/2008 | Wee et al. | |
| 2008/0301090 A1 | 12/2008 | Sadagopan et al. | |
| 2008/0301811 A1* | 12/2008 | Jung | G06Q 30/04 726/23 |
| 2009/0049547 A1* | 2/2009 | Fan | H04L 63/168 726/22 |
| 2009/0083184 A1 | 3/2009 | Eisen et al. | |
| 2011/0055104 A1 | 3/2011 | Sun et al. | |
| 2011/0208714 A1 | 8/2011 | Soukal et al. | |
| 2012/0233692 A1* | 9/2012 | Oh | G06F 21/52 726/22 |
| 2013/0332468 A1 | 12/2013 | Hardas et al. | |
| 2014/0114877 A1 | 4/2014 | Montano | |
| 2014/0214570 A1 | 7/2014 | Smolev et al. | |
| 2015/0205862 A1 | 7/2015 | Campagne et al. | |
| 2015/0264073 A1 | 9/2015 | Tavakoli et al. | |
| 2015/0326674 A1 | 11/2015 | Kruglick et al. | |
| 2015/0341383 A1 | 11/2015 | Reddy et al. | |
| 2016/0065600 A1* | 3/2016 | Lee | H04L 63/1416 726/23 |
| 2016/0196566 A1 | 7/2016 | Murali et al. | |
| 2016/0259742 A1* | 9/2016 | Faulkner | G06F 11/3452 |
| 2016/0321711 A1 | 11/2016 | Wouhaybi et al. | |
| 2017/0220971 A1* | 8/2017 | Giammaria | H04L 67/22 |
| 2017/0221111 A1 | 8/2017 | Salehi et al. | |
| 2017/0230229 A1* | 8/2017 | Sasturkar | G06F 16/285 |
| 2017/0272458 A1* | 9/2017 | Muddu | G06F 3/04842 |
| 2018/0048658 A1 | 2/2018 | Hittel et al. | |
| 2018/0196684 A1 | 7/2018 | Pengfei et al. | |
| 2018/0218295 A1* | 8/2018 | Hasija | G06Q 10/067 |
| 2018/0278647 A1 | 9/2018 | Gabaev et al. | |
| 2018/0357683 A1 | 12/2018 | Pickover et al. | |
| 2019/0034986 A1 | 1/2019 | Robinson et al. | |
| 2019/0379700 A1* | 12/2019 | Canzanese, Jr. | H04L 63/20 |
| 2020/0012981 A1* | 1/2020 | Davison | G06Q 10/06313 |
| 2020/0311309 A1 | 10/2020 | Dawer et al. | |
| 2020/0342006 A1* | 10/2020 | Rossi | G06F 16/28 |

OTHER PUBLICATIONS

Walgampaya "Cracking the Smart ClickBot", Conference: 13th IEEE International Symposium on Web Systems Evolution, WSE 2011, Williamsburg, VA, USA, Sep. 30, 2011 Cite this publication, DOI: 10.1109/WSE.2011.6081830 , retrieved on Oct. 9, 2019.

Yafeng "Positive Unlabeled Learning for Deceptive Reviews Detection", Wuhan University, published in Proceedings of the 2014 Conference on Empirical Methods in Natural Language Processing (EMNLP), retrieved on Oct. 9, 2019.

Notice of Allowance dated Apr. 2, 2021 received in respect of a related U.S. Appl. No. 16/868,363.

Office Action dated May 13, 2021 received in respect of a related U.S. Appl. No. 16/869,878.

* cited by examiner

700

| UID | Query | Clicked hosts |
| --- | --- | --- |
| 855921 | Construction supplier | Constructionsupply.com<br>Bestconstructionparts.com |
| 633522 | Restaurants in France | Restaurantrating.fr |
| 228716 | How far is moon | Moonfacts.com |
| 359113 | Bench press tips | Workoutadvice.com |
| 633522 | French food lyons | Lyonsrestos.fr<br>Frenchfoodreview.com |
| 228716 | Moon pictures | Bestmoonpictures.com<br>Moonphotography.com |
| 855921 | Dog hair styles | Freedoghairadvice.com |
| 155113 | Construction books | Constructionbooks.com<br>Booklist.com |
| 633522 | Moon pictures | Moonphotography.com |
| 855921 | Best books | Booklist.com<br>Newyorkbookranks.com |
| 359113 | Protein powder | Mealreplacement.org<br>Dietsupplement.com |

FIG. 7

METHOD OF AND SYSTEM FOR IDENTIFYING ABNORMAL SITE VISITS

CROSS-REFERENCE

The present application claims priority to Russian Patent Application No. 2019128025, entitled "Method of and System for Identifying Abnormal Site Visits", filed Sep. 5, 2019, the entirety of which is incorporated herein by reference.

FIELD

The present technology relates to detecting abnormal web search behavior in general and, more specifically, to a method of and a system for determining web hosts receiving abnormal site visits.

BACKGROUND

The volume of available information through various Internet resources has grown exponentially over the past few decades. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

When the user submits a search query, the search engine generates a list of relevant web resources (based on an analysis of crawled web resources, an indication of which is stored in a crawler database in a form of posting lists or the like). The search engine then ranks the so-generated list of search results. The generation of the list and/or ranking of search results may be performed by various means, such as by executing a machine learning algorithm (MLA). The MLA ranks the list of search results based on their relevancy to the search query. The MLA is "trained" to predict relevancy of the given search result to the search query based on a plethora of "features" associated with the given search result, as well as indications of past users' interactions with search results when submitting similar search queries in the past.

In order to rank the list of search results, various factors are considered, such as previously recorded web search history. The web search history indicates which search results were selected by users that previously submitted the same or a similar search query. It is assumed that the web hosts selected by prior users submitting similar queries are the most relevant web hosts for that search query. To provide the most useful information to a user, it is beneficial to give a higher ranking to web hosts that were previously selected by users.

Website promoters know that web search history is influential on the search rankings. Some bad actors try to increase the rankings of a website by instructing users to submit specified queries and, after receiving the ranked list of search results, select specified results. The bad actors may pay the users to perform the searches. These abnormal site visits can cause web hosts to be ranked higher in response to a query, even though those web hosts might not be particularly relevant. When results are returned to a user that are not relevant, the user's satisfaction with the search engine will decrease.

U.S. Pat. No. 9,092,510 issued to Google Inc., on Jul. 28, 2015, discloses a search result ranking system that may include a safeguard against spammers who generate fraudulent clicks in an attempt to boost certain search results. A safeguard may be employed using a user model that describes how a user should behave over time, such that fraudulent clicks may be ignored in the ranking process. The fraudulent clicks can also be detected based on abnormal distribution of click positions, click durations, or clicks per minute/hour/day.

US 2008/0172271 assigned to NHN Corporation and filed on Jan. 15, 2008, discloses tracking user activities after clicking a web site to determine if the user's click is an invalid click. An invalid click is a click made by a user with malicious intent or a click made by an automated script or computer program. Actions performed by a user after clicking a search advertisement are collected, stored, and then compared to an average action pattern performed on the website. Based on the comparison, a determination is made as to whether the user performed an invalid click.

Search Engine Click Spam Detection Based on Bipartite Graph Propagation, published in WSDM '14 Proceedings of the 7th ACM international conference on Web search and data mining on Feb. 24, 2014, discloses a system and method that may be used to identify click spam occurring on search engines or the like with the purpose of increasing a webpage's search engine optimization ranking. The method includes modelling user actions and the time intervals in which they happen to identify possible cheating users and using a graphing algorithm to map suspected cheating user session characteristics to aid in better identifying further cheating users.

SUMMARY

Developers of the present technology have appreciated at least one technical problem associated with the prior art approaches.

The present technology relates to detecting abnormal web search behavior in general, and more specifically to methods and systems for determining web hosts receiving abnormal site visits. As has been alluded to above, various bad actors may seek to influence the ranking of a web host on a search engine results page (SERP). For example, a user may be given instructions to enter a specified query into a search engine and, after receiving the SERP, to select a specific web host in the SERP. Various techniques have been developed for identifying abnormal web search behavior.

Search engine operators, such as Google™, Yandex™, Bing™ and Yahoo™, among others, have access to a large amount of web search history with respect to search results appearing in response to user queries. The web search history includes records detailing the web hosts in a SERP that were selected by a user. This web search history may be used to identify abnormal web search behavior.

When browsing the internet, users typically visit a series of naturally affiliated web hosts. The naturally affiliated web hosts may share a common theme. For example, if a user visits a first web host that provides news about football, the user may then visit a second web host that provides the home page of a football club. In this example, both web hosts are thematically related to football, and thus are naturally affiliated. Users that are receiving instructions from a bad actor may visit web hosts that are non-naturally affiliated. To detect abnormal site visits, the web search history may be analyzed to identify users that have visited non-naturally affiliated web hosts.

User interaction data describing the browsing history of users may be collected. Web hosts that are not-naturally affiliated by theme may be affiliated based on the user interaction data. Even though web hosts are not thematically related, similar groups of users may visit both web hosts. Although the web hosts are not thematically related, they may be related in such a way that a group of users access the web hosts. The user interaction data may be analyzed to determine whether a group of web hosts are affiliated. To identify web hosts that received abnormal site visits, the web hosts may first be filtered based on whether they are naturally affiliated by theme, and then may be further filtered based on whether they web hosts are affiliated based on user interaction data.

In accordance with the non-limiting embodiments of the present technology, a graph of the web search history, or a portion of the web search history, may be generated. The graph comprises nodes and edges connecting the nodes. Each edge is connected to two nodes. Each node is a web host in the web search history. Each edge in the graph is assigned an edge weight. The edge weight for each edge is determined based on the number of users that visited both the web host of the first node connected to the edge and the web host of the second node connected to the edge.

In accordance with the non-limiting embodiments of the present technology, after generating the graph, one or more themes are identified for each node in the graph. The themes are based on the subject matter of the web host of the node. The themes of nodes that are connected to each other are then compared to determine whether the web hosts of the nodes are naturally affiliated. If an edge connects two nodes having hosts that are naturally affiliated, that edge is removed from the graph.

After generating the graph, the nodes in the graph are clustered based on edge weight. The resulting clusters are clusters of nodes where individual users have visited multiple hosts in the cluster. The hosts in each cluster are analyzed to determine whether the hosts in that cluster are affiliated based on user interaction data. The user interaction data describes web browsing history of users, such as which web hosts the users visited and/or the user's behavior while visiting the web hosts. If the hosts in a cluster are determined to be affiliated based on the user interaction data, the cluster is removed. The remaining clusters, those in which the web hosts are not affiliated based on the user interaction data, are considered to have been subject to abnormal site visits. The ranking in SERPs of web hosts associated with abnormal site visits may be reduced. The abnormal site visits may be removed from the web search history.

According to a first broad aspect of the present technology, there is provided a method for determining web hosts receiving abnormal site visits. The method is executable on a server and comprises: retrieving web search history corresponding to a plurality of users; generating a graph of the web search history, wherein each node in the graph is a web host in the web search history, wherein nodes are connected to other nodes via edges, each edge having an associated edge weight, and wherein the edge weight is determined based on an amount of users that visited both hosts connected by the edge; clustering, based on the edge weights, the nodes in the graph, thereby forming a plurality of node clusters; retrieving user interaction data corresponding to the node clusters, the user interaction data associated with the plurality of users having visited the web hosts associated with the node clusters; determining, for each node cluster, whether web hosts in the respective cluster were affiliated based on the user interaction data; removing, from the graph, each node cluster comprising web hosts that were affiliated based on the user interaction data; and storing, for each web host associated with a cluster remaining in the graph, an indicator that the respective web host is associated with abnormal site visits.

In some implementations of the method, the method further comprises, before clustering the nodes in the graph: determining, for each node in the graph, one or more themes corresponding to the respective node; and removing, from the graph, edges connecting two nodes with associated themes.

In some implementations of the method, the determining the one or more themes for each node in the graph comprises querying a database for themes associated with a web host corresponding to the respective node.

In some implementations of the method, the method further comprises: receiving a search query; generating based on the search query, a search engine results page ranking a plurality of web hosts corresponding to the search query; and reducing a rank in the search engine results page of a web host associated with abnormal site visits.

In some implementations of the method, the method further comprises: receiving a search query; generating, based on the search query, a search engine results page ranking a plurality of web hosts corresponding to the search query; and removing, from the search engine results page, a web host associated with abnormal site visits.

In some implementations of the method, the method further comprises removing, from the web search history, data corresponding to web hosts associated with abnormal site visits.

In some implementations of the method, the method further comprises: determining a plurality of user identifiers corresponding to the abnormal site visits; and storing, for each user identifier of the plurality of user identifiers, an indicator that the respective user identifier is associated with abnormal site visits.

In some implementations of the method, the user interaction data comprises the web search history.

In some implementations of the method, the user interaction data comprises web browser usage data.

In some implementations of the method, the user interaction data comprises web script data.

In some implementations of the method, the method further comprises determining each edge weight based on a number of matching search queries entered by the users that visited both hosts connected by an edge.

In accordance with yet another broad aspect of the present technology, there is provided a system for determining web hosts receiving abnormal site visits. The system comprises a processor and a non-transitory computer-readable medium comprising instructions. The processor, upon executing the instructions, is configured to: retrieve web search history corresponding to a plurality of users; generate a graph of the web search history, wherein each node in the graph is a web host in the web search history, wherein nodes are connected to other nodes via edges, each edge having an associated edge weight, and wherein the edge weight is determined based on an amount of users that visited both hosts connected by the edge; cluster, based on the edge weights, the nodes in the graph, thereby forming a plurality of node clusters; retrieve user interaction data corresponding to the node clusters, the user interaction data associated with a plurality of users having visited the web hosts associated with the node clusters; determine, for each node cluster, whether web hosts in the respective cluster were affiliated based on the user interaction data; remove, from the graph, each node cluster comprising web hosts that were affiliated based on the user interaction data; and store, for each web host associated with a cluster remaining in the graph, an indicator that the respective web host is associated with abnormal site visits.

In some implementation of the system, the processor, upon executing the instructions, is further configured to: determine, for each node in the graph, one or more themes corresponding to the respective node; and remove, from the graph, edges connecting two nodes with associated themes.

In some implementation of the system, the processor, upon executing the instructions, is further configured to: receive a search query; generate, based on the search query, a search engine results page ranking a plurality of web hosts corresponding to the search query; and reduce a rank in the search engine results page of a web host associated with abnormal site visits.

In some implementation of the system, the processor, upon executing the instructions, is further configured to: receive a search query; generate, based on the search query, a search engine results page ranking a plurality of web hosts corresponding to the search query; and remove, from the search engine results page, a web host associated with abnormal site visits.

In some implementation of the system, the processor, upon executing the instructions, is further configured to remove, from the web search history, data corresponding to web hosts associated with abnormal site visits.

In some implementation of the system, the processor, upon executing the instructions, is further configured to: determine a plurality of user identifiers corresponding to the abnormal site visits; and store, for each user identifier of the plurality of user identifiers, an indicator that the respective user identifier is associated with abnormal site visits.

In some implementation of the system, the processor, upon executing the instructions, is further configured to determine the edge weight based on a number of matching queries entered by the users that visited both web hosts connected by an edge.

In accordance with another broad aspect of the present technology, there is provided a method for determining web hosts receiving abnormal site visits. The method is executable on a server and comprises: retrieving web search history corresponding to a plurality of users; for each respective web host in the search history: determining, based on the web search history, a list of other web hosts visited by users that visited the respective web host, and removing, from the list of other web hosts, other web hosts having a natural affiliation with the respective web host; clustering, based on the lists of other web hosts, web hosts that are non-naturally affiliated, thereby forming a plurality of clusters of web hosts; retrieving user interaction data corresponding to the node clusters, the user interaction data associated with the plurality of users having visited the web hosts associated with the node clusters; removing clusters comprising web hosts that are affiliated with each other based on the user interaction data; and storing, for each web host associated with remaining clusters, an indicator that the respective web host is associated with abnormal site visits.

In some implementations of the method, the removing the other web hosts having a natural affiliation with the respective web host comprises, for each other web host in the list of other web hosts, comparing one or more themes corresponding to the respective web host to one or more themes corresponding to the respective other web host.

In some implementations of the method, the method further comprises: receiving a search query; generating, based on the search query, a search engine results page ranking a plurality of web hosts corresponding to the search query; and reducing a rank in the search engine results page of a web host associated with abnormal site visits.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server."

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drives, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first," "second," "third," etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 7 depicts web search history in accordance with embodiments of the present technology.

DETAILED DESCRIPTION

Figure 1:
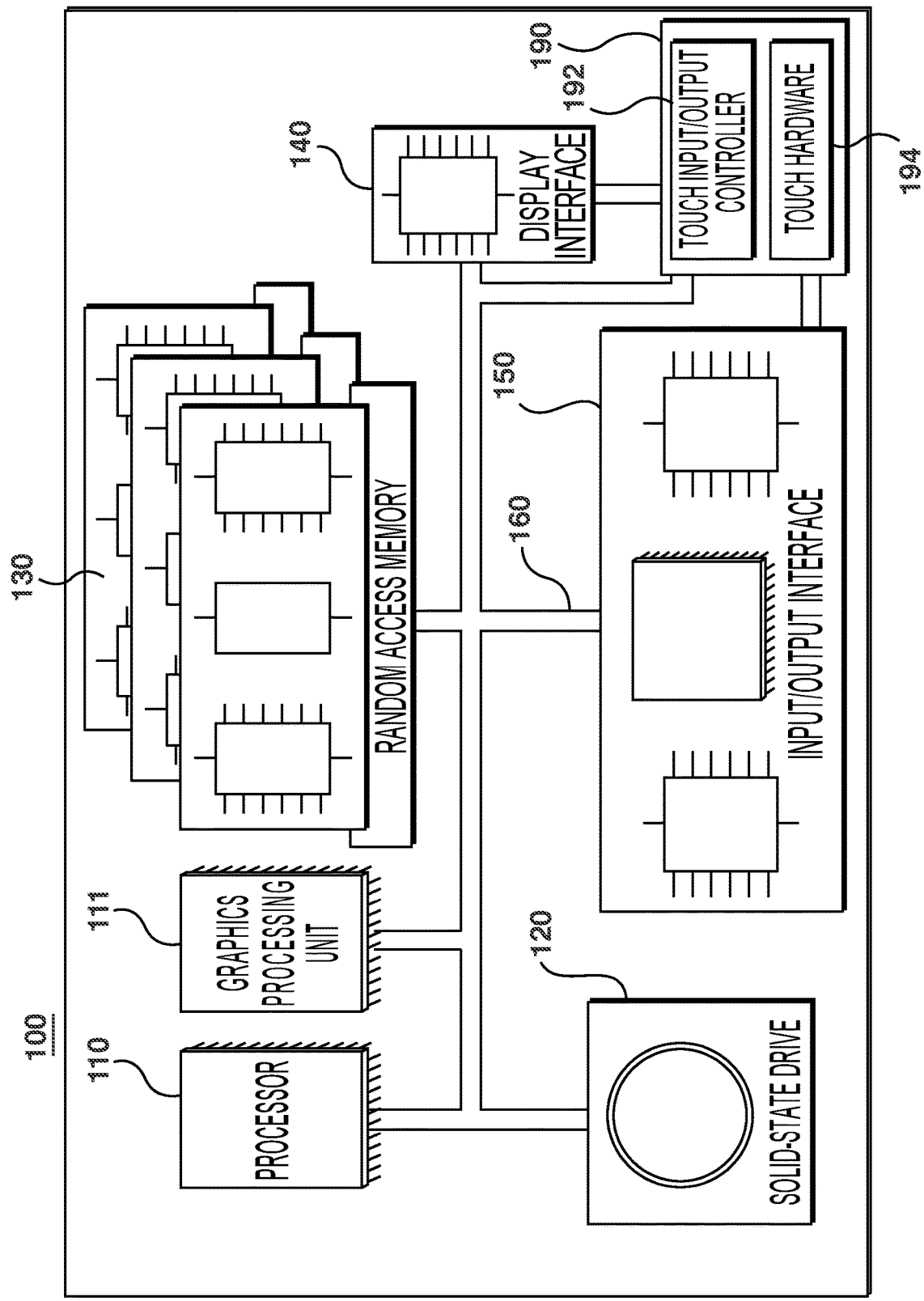
FIG. 1 is an illustration of components and features of a computing device in accordance with embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is shown a computing device 100 suitable for use with some implementations of the present technology. The computing device 100 comprises various hardware components including one or more single or multi-core processors collectively represented by processor 110, a graphics processing unit (GPU) 111, a solid-state drive 120, a random access memory 130, a display interface 140, and an input/output interface 150.

Communication between the various components of the computing device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computing device 100 in addition to or instead of the touchscreen 190.

According to implementations of the present technology, the solid-state drive 120 stores program instructions suitable for being loaded into the random access memory 130 and executed by the processor 110 and/or the GPU 111. For example, the program instructions may be part of a library or an application.

The computing device 100 may be a server, a desktop computer, a laptop computer, a tablet, a smartphone, a personal digital assistant or any device that may be configured to implement the present technology, as should be understood by a person skilled in the art.

Figure 2:
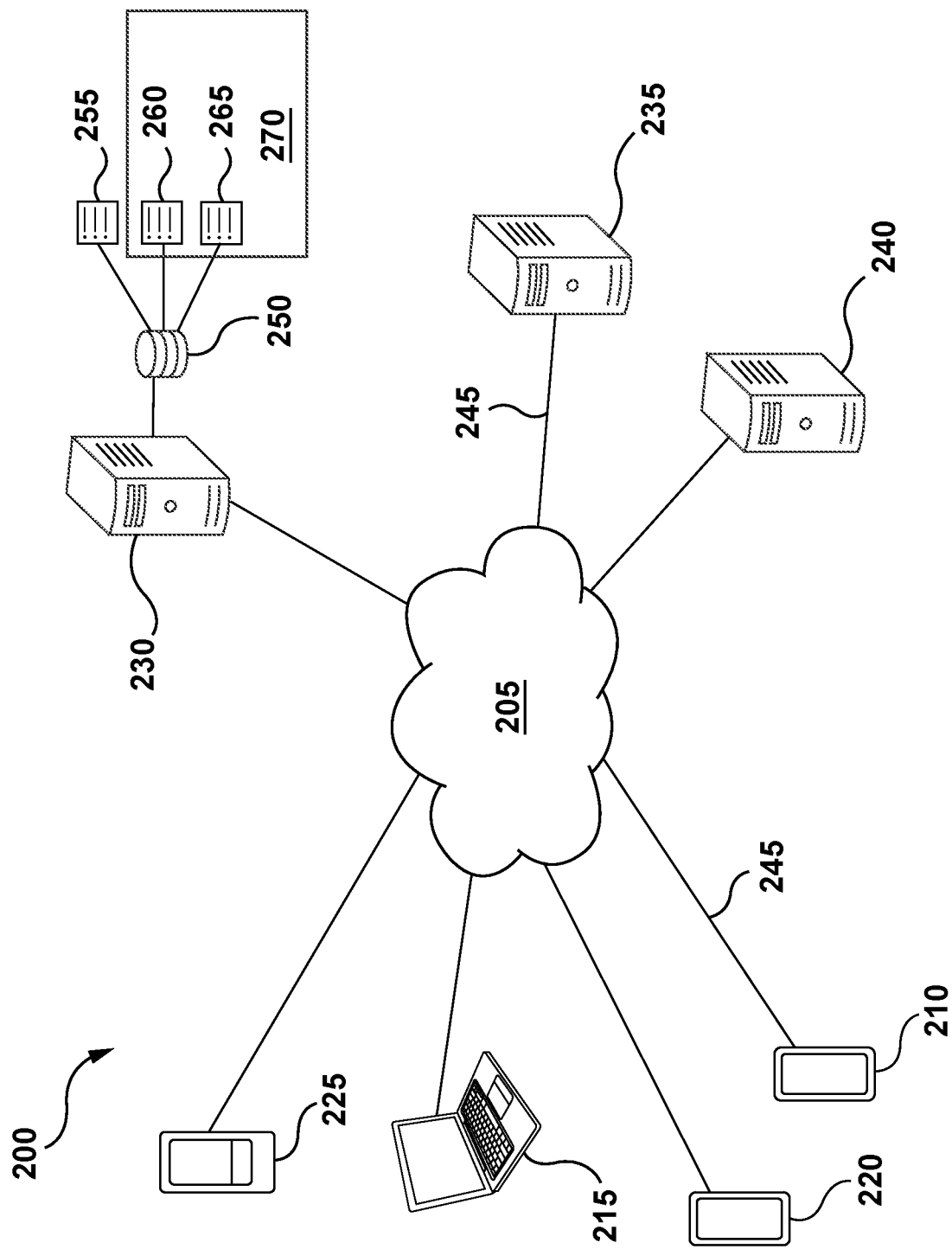
FIG. 2 depicts a diagram of a system implemented in accordance with non-limiting embodiments of the present technology.

With reference to FIG. 2, there is depicted a system 200, the system 200 implemented according to non-limiting embodiments of the present technology. The system 200 comprises a first client device 210, a second client device 215, a third client device 220, and a fourth client device 225, each coupled to a communications network 205 via a respective communication link 245. The system 200 comprises a search engine server 230, an analytics server 235 and an abnormal site visit detection server 240 coupled to the communications network 205 via their respective communication link 245.

The first client device 210, second client device 215, third client device 220, fourth client device 225, search engine server 230, analytics server 235, and/or abnormal site visit detection server 240 may be computing devices 100 and/or contain components of computing devices 100. As an example only, the first client device 210 may be implemented as a smartphone, the second client device 215 may be implemented as a laptop, the third client device 220 may be implemented as a smartphone and the fourth client device 225 may be implemented as a tablet. In some non-limiting embodiments of the present technology, the communications network 205 can be implemented as the Internet. In other embodiments of the present technology, the communications network 205 can be implemented differently, such as any wide-area communications network, local-area communications network, a private communications network and the like.

How the communication link 245 is implemented is not particularly limited and will depend on how the first client device 210, the second client device 215, the third client device 220 and the fourth client device 225 are implemented. Merely as an example and not as a limitation, in those embodiments of the present technology where at least one of the first client device 210, the second client device 215, the third client device 220 and the fourth client device 225 is implemented as a wireless communication device (such as a smartphone), the communication link 245 can be implemented as a wireless communication link (such as but not limited to, a 3G communications network link, a 4G communications network link, a Wireless Fidelity, or WiFi® for short, Bluetooth® and the like). In those examples, where at least one of the first client device 210, the second client device 215, the third client device 220 and the fourth client device 225 are implemented respectively as laptop, smartphone, tablet computer, the communication link 245 can be either wireless (such as the Wireless Fidelity, or WiFi® for short, Bluetooth® or the like) or wired (such as an Ethernet based connection).

It should be expressly understood that implementations for the first client device 210, the second client device 215, the third client device 220, the fourth client device 225, the communication link 245 and the communications network 205 are provided for illustrative purposes only. As such, those skilled in the art will easily appreciate other specific implementation details for the first client device 210, the second client device 215, the third client device 220, the fourth client device 225 and the communication link 245 and the communications network 205. As such, by no means are examples provided herein above meant to limit the scope of the present technology.

While only four client devices 210, 215, 220 and 225 are illustrated, it is contemplated that any number of client devices 210, 215, 220 and 225 could be connected to the system 200. It is further contemplated that in some implementations, the number of client devices 210, 215, 220 and 225 included in the system 200 could number in the tens or hundreds of thousands.

Also coupled to the communications network 205 is the aforementioned search engine server 230. The search engine server 230 can be implemented as a conventional computer server. In an example of an embodiment of the present technology, the search engine server 230 can be implemented as a Dell™ PowerEdge™ Server running the Microsoft™ Windows Server™ operating system. Needless to say, the search engine server 230 can be implemented in any other suitable hardware and/or software and/or firmware or a combination thereof. In the depicted non-limiting embodiment of present technology, search engine server 230 is a single server. In alternative non-limiting embodiments of the present technology, the functionality of the search engine server 230 may be distributed and may be implemented via multiple servers. In some embodiments of the present technology, the search engine server 230 is under control and/or management of a search engine operator. Alternatively, the search engine server 230 can be under control and/or management of a service provider.

Generally speaking, the purpose of the search engine server 230 is to (i) execute searches; (ii) execute analysis of search results and perform ranking of search results; (iii) group results and compile the search result page (SERP) to be outputted to an electronic device (such as one of the first client device 210, the second client device 215, the third client device 220 and the fourth client device 225).

How the search engine server 230 is configured to execute searches is not particularly limited. Those skilled in the art will appreciate several ways and means to execute the search using the search engine server 230 and as such, several structural components of the search engine server 230 will only be described at a high level. The search engine server 230 may maintain a search log database 250.

In some embodiments of the present technology, the search engine server 230 can execute several searches, including but not limited to, a general search and a vertical search.

The search engine server 230 is configured to perform general web searches, as is known to those of skill in the art. The search engine server 230 is also configured to execute one or more vertical searches, such as an images vertical search, a music vertical search, a video vertical search, a news vertical search, a maps vertical search and the like. The search engine server 230 is also configured to, as is known to those of skill in the art, execute a crawler algorithm—which algorithm causes the search engine server 230 to "crawl" the Internet and index visited web sites into one or more of the index databases, such as the search log database 250.

The search engine server 230 is configured to generate a ranked search results list, including the results from the general web search and the vertical web search. Multiple algorithms for ranking the search results are known and can be implemented by the search engine server 230.

Just as an example and not as a limitation, some of the known techniques for ranking search results by relevancy to the user-submitted search query are based on some or all of: (i) how popular a given search query or a response thereto is in searches; (ii) how many results have been returned; (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the SERP. The search engine server 230 can thus calculate and assign a relevance score (based on the different criteria listed above) to each search result obtained in response to a user-submitted search query and generate a SERP, where search results are ranked according to their respective relevance scores. In the present embodiment, the search engine server 230 may execute a plurality of machine learning algorithms for ranking documents and/or generate features for ranking documents.

The search engine server typically maintains the search log database 250. Generally, the search log database 250 may maintain an index 255, a query log 260, and a user interaction log 265.

The purpose of the index 255 is to index documents, such as, but not limited to, web pages, images, PDFs, Word™ documents, PowerPoint™ documents, that have been crawled (or discovered) by the crawler of the search engine server 230. As such, when a user of one of the first client device 210, the second client device 215, the third client device 220, and the fourth client device 225 inputs a query and performs a search on the search engine server 230, the search engine server 230 analyzes the index 255 and retrieves documents that contain terms of the query, and ranks them according to a ranking algorithm.

The purpose of the query log 260 is to log searches that were made using the search engine server 230. More specifically, the query log 260 maintains terms of search queries (i.e. the associated search words) and the associated search results. It is noted that the query log 260 can be maintained in an anonymized manner—i.e. search queries are not trackable to the users who have submitted the search query.

More specifically, the query log 260 may include a list of queries with their respective terms, with information about documents that were listed by the search engine server 230 in response to a respective query, a timestamp, and may also contain a list of users identified by anonymous IDs (or without an ID altogether) and the respective documents they have clicked on after submitting a query. In some embodiments, the query log 260 may be updated every time a new search is performed on the search engine server 230. In other embodiments, the query log 260 may be updated at predetermined times. In some embodiments, there may be a plurality of copies of the query log 260, each corresponding to the query log 260 at different points in time.

The user interaction log 265 may be linked to the query log 260, and list user interaction parameters as tracked by the analytics server 235 after a user has submitted a query and clicked on one or more documents in a SERP on the search engine server 230. As a non-limiting example, the user interaction log 265 may contain reference to a document, which may be identified by an ID number or an URL, a list of queries, where each query of the list of queries is associated with a plurality of user interaction parameters, which will be described in more detail in the following paragraphs. The plurality of user interaction parameters may generally be tracked and compiled by the analytics server 235, and in some embodiments may be listed for each individual user.

Non-limiting examples of user interactions tracked by the user interaction log 265 include (but are not limited to):
- Loss/Win: was the document clicked in response to the search query or not.
- Dwell time: time a user spends on a document before returning to the SERP.
- Long/short click: was the user interaction with the document long or short, compared to the user interaction with other documents on the SERP.

Naturally, the above list is non-exhaustive and may include other types of user interactions without departing from the scope of the present technology. In some embodiments, the analytics server 235 may compile user interaction data (which may, as a non-limiting example, include user interactions for every hour) and generate user interactions to be stored in the user interaction log 265 in a suitable format for implementing the present technology (which, may as a non-limiting example, be user interactions for a predetermined period of time of 3 months). In other embodiments, the user interaction log 265 may store the user interaction data in a raw form, such that it can retrieved and compiled by at least one of the search engine server 230, the analytics server 235, the abnormal site visit detection server 240, or another server (not depicted) in a suitable format for implementing the present technology.

In some embodiments, the query log 260 and the user interaction log 265 may be implemented as a single log. The information stored in the query log 260 and the user interaction log 265, whether implemented as a single log or multiple logs, form web search history 270.

Also coupled to the communications network 205 is the above-mentioned analytics server 235. The analytics server 235 can be implemented as a conventional computer server. In an example of an embodiment of the present technology, the analytics server 235 can be implemented as a Dell™ PowerEdge™ Server running the Microsoft™ Windows Server™ operating system. Needless to say, the analytics server 235 can be implemented in any other suitable hardware and/or software and/or firmware or a combination thereof. In the depicted non-limiting embodiment of present technology, the analytics server 235 is a single server. In alternative non-limiting embodiments of the present technology, the functionality of the analytics server 235 may be distributed and may be implemented via multiple servers. In other embodiments, the functionality of the analytics server 235 may be performed completely or in part by the search engine server 230. In some embodiments of the present technology, the analytics server 235 is under control and/or management of a search engine operator. Alternatively, the analytics server 235 can be under control and/or management of another service provider.

Generally speaking, the purpose of the analytics server 235 is to analyze user interactions with search results provided by the search engine server 230 in response to user requests (e.g. made by users of one of the first client device 210, the second client device 215, the third client device 220 and the fourth client device 225) based on data stored in the user interaction log 265.

Non-limiting examples of user interaction parameters generated by the analytics server 235 include (but are not limited to):
- Click-through rate (CTR): Number of clicks on an element divided by the number of times the element is shown (impressions).
- Session Time: Mean session time, measured in seconds.
- Log Session Time: Mean logarithmic value of session times.
- Queries: The number of queries submitted by a user.
- Clicks: The number of clicks performed by a user.
- Clicks per Query: The average number of clicks per query for the user.
- Click-through rate (CTR): Number of clicks on an element divided by the number of times the element is shown (impressions).
- Daily Active Users (DAU): Number of unique users engaging with the service during a day.
- Average daily sessions per user (S/U): u S(u) |u|, where S(u) indicates user u's daily session number and |u| is the total number of users on that day.
- Average unique queries per session (UQ/S): s UQ(s) |s|, where UQ(s) represents the number of unique queries within session s, and |s| the total number of sessions on that day.
- Average session length per user (SL/U): the total number of queries within a session, averaged over each user.
- Percentage of navigational queries per user (%-Nav-Q/U): click positions: if over n % of all clicks for a query is concentrated on top-3 ranked URLs, this query is considered to be navigational. Otherwise it is treated as informational. The value of n may be set to 80.
- Average query length per user (QL/U): the query length measures the number of words in a user query.
- Average query success rate per user (QSuccess/U): a user query is said to be successful if the user clicks one or more results and stays at any of them for more than 30 seconds.
- Average query interval per user (QI/U): the average time difference between two consecutive user queries within a user session.
- Dwell time: time a user spends on a document before returning to the SERP.

Naturally, the above list is non-exhaustive and may include other types of user interaction parameters without departing from the scope of the present technology.

The analytics server 235 may transmit the tracked user interaction parameters to the search engine server 230 such that it can be stored in the user interaction log 265. In some embodiments, the analytics server 235 may store the user interaction parameters and associated search results locally in a user interaction log (not depicted). In alternative non-limiting embodiments of the present technology, the functionality of the analytics server 235 and the search engine server 230 can be implemented by a single server.

Also coupled to the communications network 205 is the above-mentioned abnormal site visit detection server 240. The abnormal site visit detection server 240 can be implemented as a conventional computer server. In an example of an embodiment of the present technology, the abnormal site visit detection server 240 can be implemented as a Dell™ PowerEdge™ Server running the Microsoft™ Windows Server™ operating system. Needless to say, the abnormal site visit detection server 240 can be implemented in any other suitable hardware and/or software and/or firmware or a combination thereof. In the depicted non-limiting embodiment of present technology, the abnormal site visit detection server 240 is a single server. In alternative non-limiting embodiments of the present technology, the functionality of the abnormal site visit detection server 240 may be distributed and may be implemented via multiple servers. In the context of the present technology, the abnormal site visit detection server 240 may implement in part the methods and system described herein. In some embodiments of the present technology, the abnormal site visit detection server 240 is under control and/or management of a search engine operator. Alternatively, the abnormal site visit detection server 240 can be under control and/or management of another service provider.

Generally speaking, the purpose of the abnormal site visit detection server 240 is to identify abnormal site visits. As described in further detail below, the abnormal site visit detection server 240 may, as an example, analyze the web search history 270 (stored in the query log 260 and/or user interaction log 265) to identify queries and/or site visits that were influenced by a malicious actor.

Figure 3:
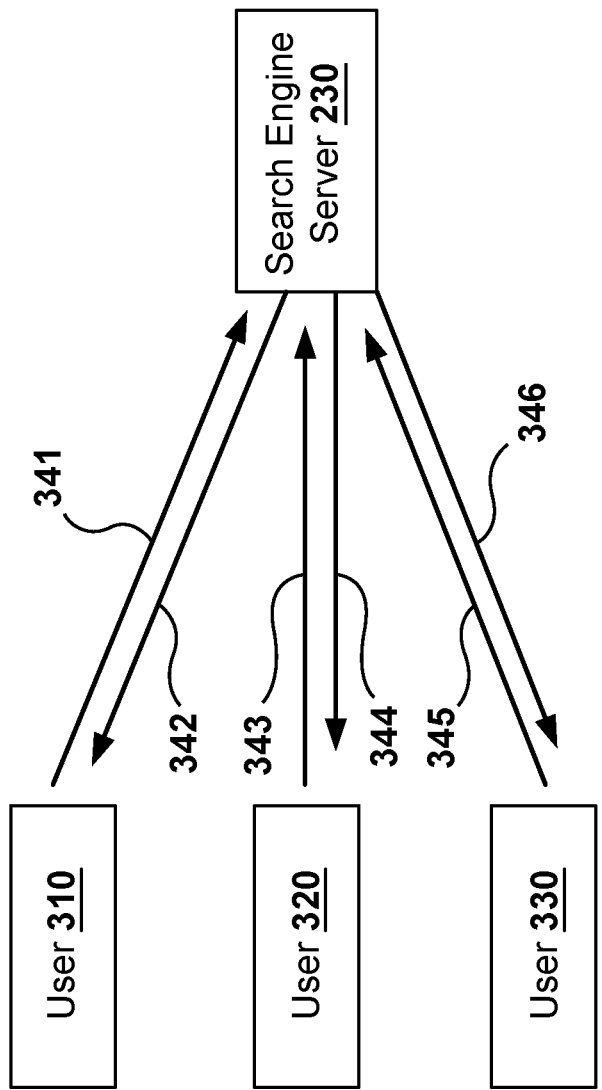
FIG. 3 depicts a diagram of normal communications between users and a search server in accordance with embodiments of the present technology.

Now turning to FIG. 3, a diagram of normal communications between users and the search engine server 230 are illustrated. As discussed above, the search engine server 230 compiles a SERP in response to a query received from a user. The SERP may be influenced by prior behavior of users, such as data stored in the web search history 270.

As illustrated in FIG. 3, a user 310 transmits a query via transmission 341 to the search engine server 230. The search engine server 230 then returns a SERP via transmission 342 to the user 310. As described above, the search engine server 230 stores various information about the interaction between the user 310 and the search engine server 230, such as which web hosts in the SERP were selected by the user 310.

Next, a user 320 transmits the same query that the user 310 had transmitted via transmission 343 to the search engine server 230. After receiving the query, the search engine server 230 transmits a SERP to the user 320 via the transmission 344. The SERP transmitted to the user 320 may be influenced by the prior actions of the user 310. For example, the ranking of the last web host selected by the user 310 may be increased in the SERP transmitted to the user 320. It is assumed that the last web host selected by the user 310 was considered by the user 310 to be the most relevant web host in the SERP.

A user 330 then transmits the same query as the users 310 and 320 to the search engine server 230 via the transmission 345. In response to the query, the search engine server 230 generates and returns a SERP to the user 330 via the transmission 346. The SERP returned to the user 330 may be influenced by the behavior of the users 310 and 320. In this manner, the search engine server 230 may continuously refine the search rankings based on recorded behavior of users. The behavior of users can be analyzed to determine which web hosts in a SERP were considered by the users to be the most relevant. Those web hosts can then be given higher rankings in future SERPs, which will increase user satisfaction because the most relevant results will be presented to the users with a high ranking in the SERPs.

Figure 4:
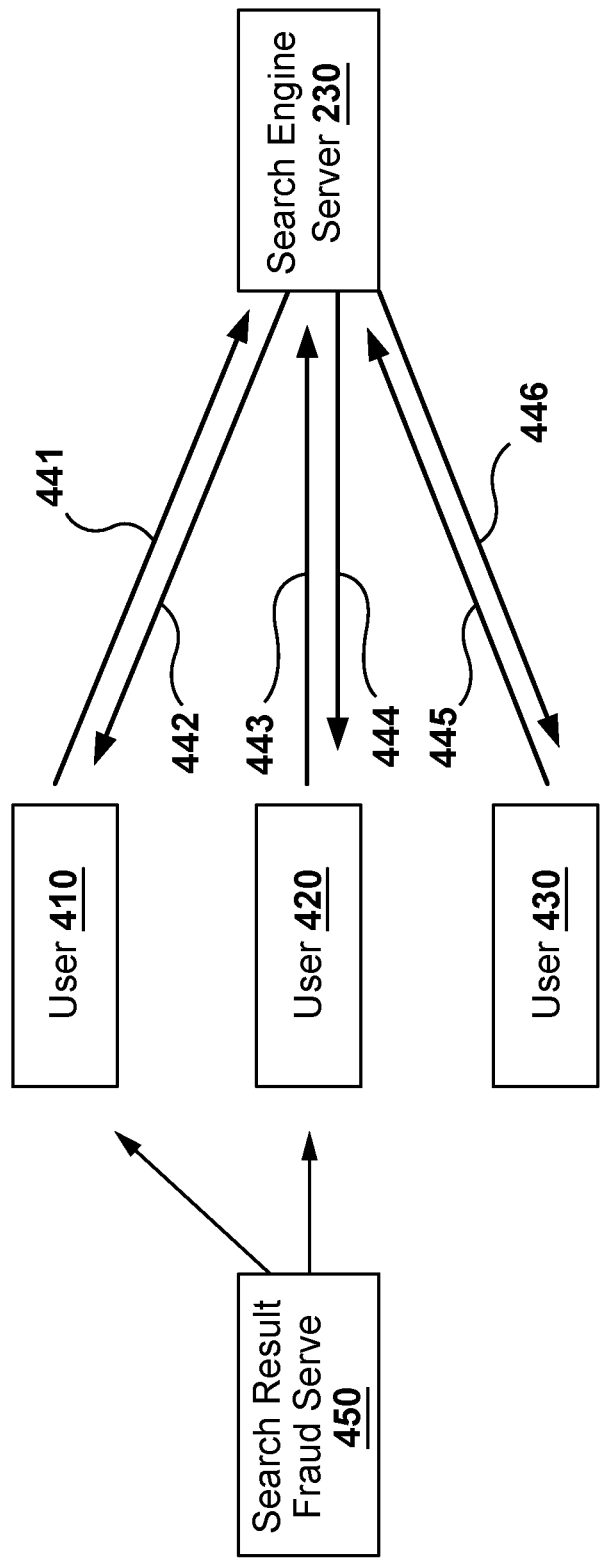
FIG. 4 depicts a diagram of abnormal communications between users and a search server in accordance with embodiments of the present technology.

FIG. 3 illustrates a diagram of naturally occurring search behavior. In contrast, FIG. 4 illustrates how a bad actor can influence the SERPs returned by the search engine server 230. In the diagram of abnormal communications illustrated in FIG. 4, a search result fraud server 450 influences the behavior of users 410 and 420. The search result fraud server 450 may provide instructions to the users 410 and 420. The instructions may indicate which search queries to enter, and which search results to select in the SERPs. The users 410 and 420 may be compensated for performing the instructions issued by the search result fraud server 450.

The user 410 transmits a query, as instructed by the search result fraud server 450, to the search engine server 230 via transmission 441. In response to the query, the search engine server 230 transmits a SERP via transmission 442 to the user 410. The user 410 then, based on the instructions from the search result fraud server 450, visits one or more web hosts by selecting links in the SERP. The search result fraud server 450 has thus influenced the web search history 270 by instructing the behavior of the user 410. The site visits performed by the user 410 are referred to herein as abnormal site visits. Rather than being natural human behavior, these abnormal site visits were performed because of instructions from a bad actor, in this case the search result fraud server 450.

The user 420 transmits the same search query as the user 410 to the search engine server 230 via the transmission 443. The search engine server 230 responds to the query by transmitting a SERP to the user 420 via the transmission 444. The rankings in the SERP transmitted to the user 420 may be influenced by the behavior of the user 410, which was dictated by the search result fraud server 450. Like the user 410, the user 420 interacts with the SERP as instructed by the search result fraud server 450. The user 420 may be instructed, by the search result fraud server 450, to select a web host whose owner has paid an entity controlling the search result fraud server 450 to increase the search ranking of that web host.

The user 430, which is a user that has not received instructions from the search result fraud server 450, transmits the same query as the users 410 and 420 to the search engine server 230 via transmission 445. The search engine server 230 then transmits a SERP to the user 430 via the transmission 446. The SERP transmitted to the user 430 is affected by the prior behavior of the users 410 and 420. The web host that the search result fraud server 450 instructed the users 410 and 420 to select will have a higher ranking in the SERP returned to the user 430 because of the behavior of the abnormal site visits from the users 410 and 420. By controlling the behavior of the users 410 and 420, the search result fraud server 450 has influenced the SERP that the user 430 receives. The user 430 is now more likely to select the web host that was promoted by the search result fraud server 450 because that web host will have a higher ranking in the SERP received by the user 430. The method 500, described in further detail below and in FIG. 5, is a method for analyzing web search history to identify abnormal user behavior, such as the behavior of the users 410 and 420.

Method (Non-Limiting Embodiment)

Figure 5:
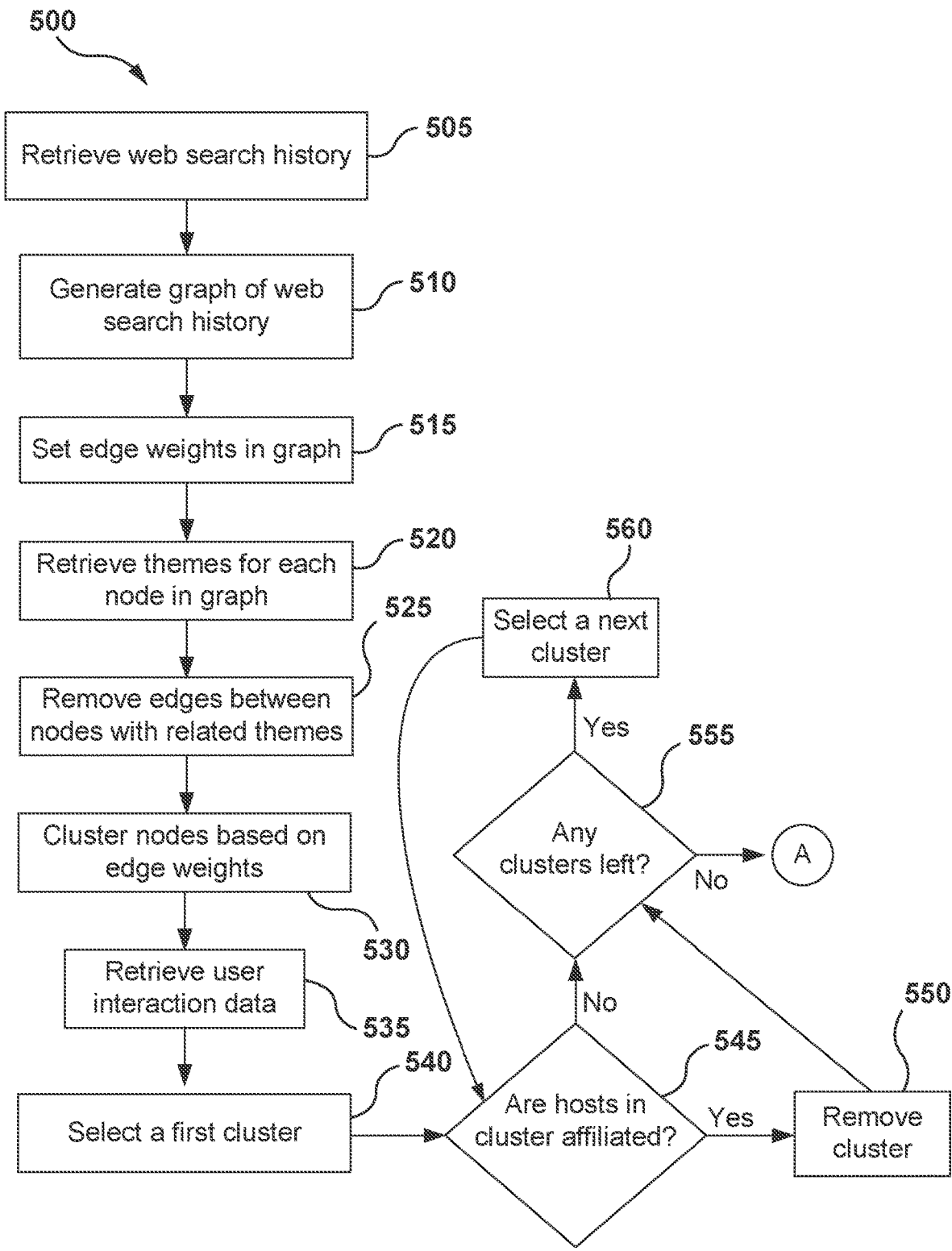
FIGS. 5 and 6 depict a flow diagram of a method for determining web hosts receiving abnormal site visits, the method executable within the system of FIG. 2 in accordance with some non-limiting embodiments of the present technology.
Figure 6:
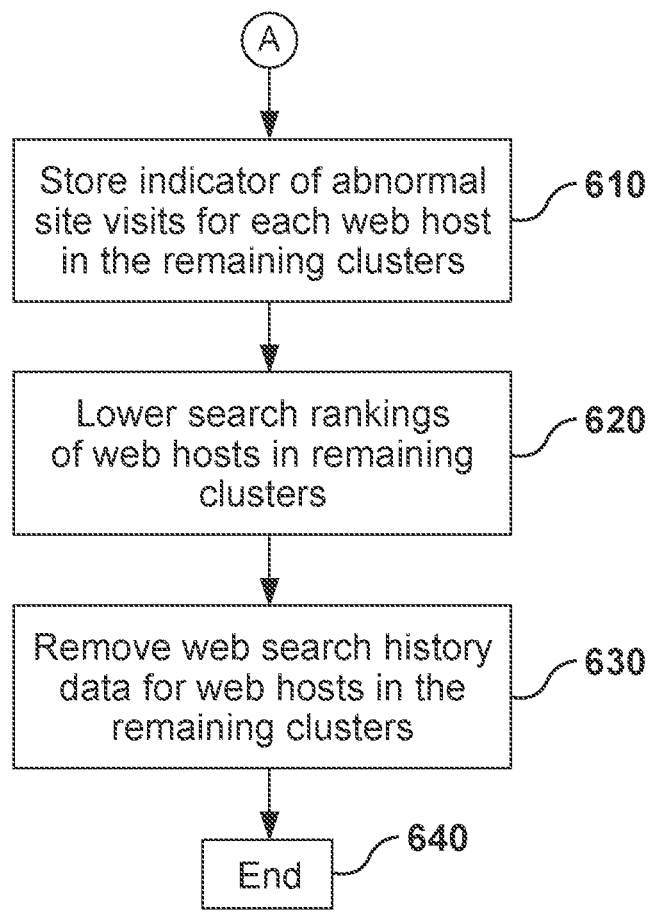

With reference to FIGS. 5 and 6, there is depicted a flow chart of a method 500, the method 500 being implementable in accordance with non-limiting embodiments of the present technology.

Step 505—Retrieving Web Search History

The method 500 begins at step 505. Data describing previous queries and user interactions, such as the web search history 270, may be retrieved. The web search history may have been stored in a query log 260, user interaction log 265, and/or other recorded data storages. FIG. 7, described in further detail below, illustrates an example of web search history that may be retrieved. The web search history may describe user IDs (UIDs), queries submitted by each user, and web hosts selected by the users after receiving SERPs in response to their queries.

The web search history 270 may be retrieved from one or more databases. For example, as described in FIG. 2, the web search history 270 may be retrieved from the search log database 250, which may be maintained by the search engine server 230. The retrieved web search history may correspond to a specified window of time. For example, web search history 270 from the previous six months may be retrieved. The retrieved web search history 270 may correspond to a specific location or region. For example, web search history corresponding to North America may be retrieved. One or more database queries may be used to retrieve the web search history. The query may indicate the time period, region, and/or other filters to be applied to the web search history.

Step 510—Generate a Graph of the Web Search History

Figure 8:
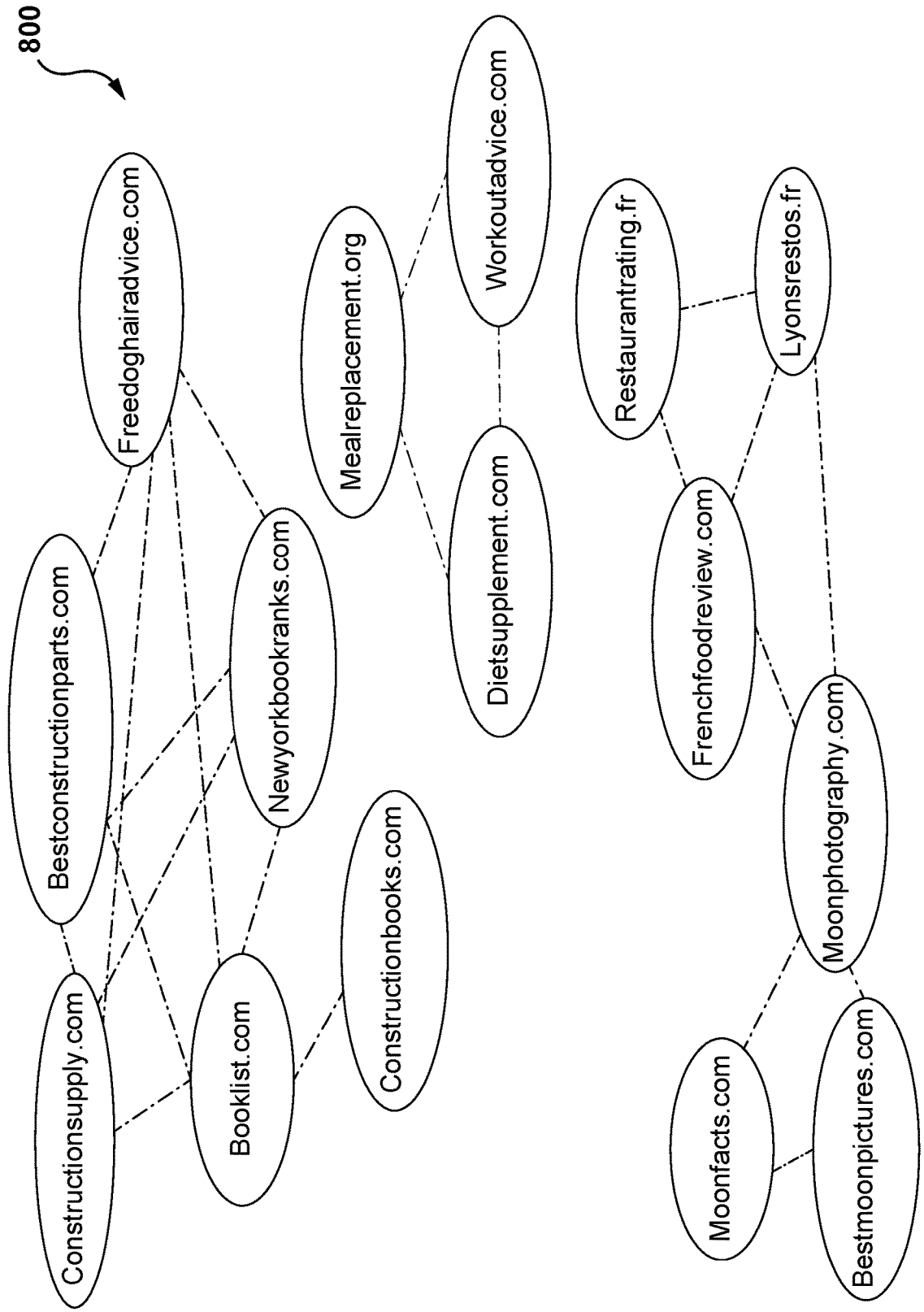
FIG. 8 depicts a graph of the web search history depicted in FIG. 7 in accordance with embodiments of the present technology.

After retrieving the web search history 270, a graph may be generated at step 510. FIG. 8, described in further detail below, illustrates an example of a graph of web search history. Each web host in the web search history 270 may be included in the graph as a node. A threshold number of visits may be used to filter the web hosts included in the graph. For example, web hosts having less than five hundred unique visitors might not be included as nodes in the graph. The graph may contain edges that each connect two nodes. Two nodes that have been visited by a same UID may be connected by an edge. For example if the web search history indicates that a user has visited both 'engadget.com' and 'gizmodo.com,' an edge connecting those two nodes would be included in the graph.

Although described as a graph, it should be understood that other data structures may be used to analyse the web search history. For each web host in the web search history, a list of other web hosts visited by UIDs that visited that web host may be generated.

Step 515—Assign Edge Weights to Each Edge in the Graph

Each edge in the graph generated at step 510 may be assigned an edge weight at step 515. The edge weight of an edge may indicate the number of UIDs that visited both web hosts connected by that edge. For example if fifty users visited both of the hosts connected by an edge, the edge weight of that edge may be assigned the value of fifty. The edge weights may be assigned based on the number of matching search queries entered by the users that visited both hosts connected by an edge. For example, if two UIDs entered the same search query and then selected both web hosts in the SERP generated in response to that query, the weight of the edge connecting those two web hosts may be increased.

Edge weights with higher values indicate that the web hosts connected by the edge have both been visited by a higher number of same visitors. Web hosts that are related, such as web hosts that have similar themes, should have higher edge weights connecting them. Users are typically expected to visit multiple web hosts that are thematically related. For example, the web hosts 'newyorker.com' and 'nytimes.com' would likely have a relatively high edge weight connecting them, as both web sites relate to New York City and to news.

Step 520—Retrieve Themes for Each Node in the Graph

At step 520 one or more themes may be retrieved and/or determined for each node in the graph. An MLA may be used to determine the one or more themes for each node in the graph. The MLA may be trained to determine, based on information corresponding to a web host such as metadata, page content, and/or other information, the one or more themes. After training the MLA, the web host address, metadata, page content, and/or other information corresponding to the web host may be input to the MLA. The MLA may output the one or more themes. The MLA may be a natural language processing (NLP) model, such as a model based on Latent Semantic Analysis (LSA), Probabilistic Latent Semantic Analysis (pLSA), Word2vec, Global Vectors for Word Representation (GloVe), or Latent Dirichlet Allocation (LDA).

A theme database (not illustrated) may be queried to retrieve the themes. The theme database may be managed by the search engine server 230. The web host corresponding to a node may be submitted to the theme database in the query, and the theme database may return one or more themes corresponding to the web host.

Themes may be determined based on content of the web host, metadata of the web host, the web search history 270, and/or other data relating to the web host. The themes may indicate a subject matter of content displayed by the web host. It should be understood that the themes may be retrieved from a database and/or generated in real time.

Step 525—Remove Edges Between Nodes With Related Themes

Figure 9:
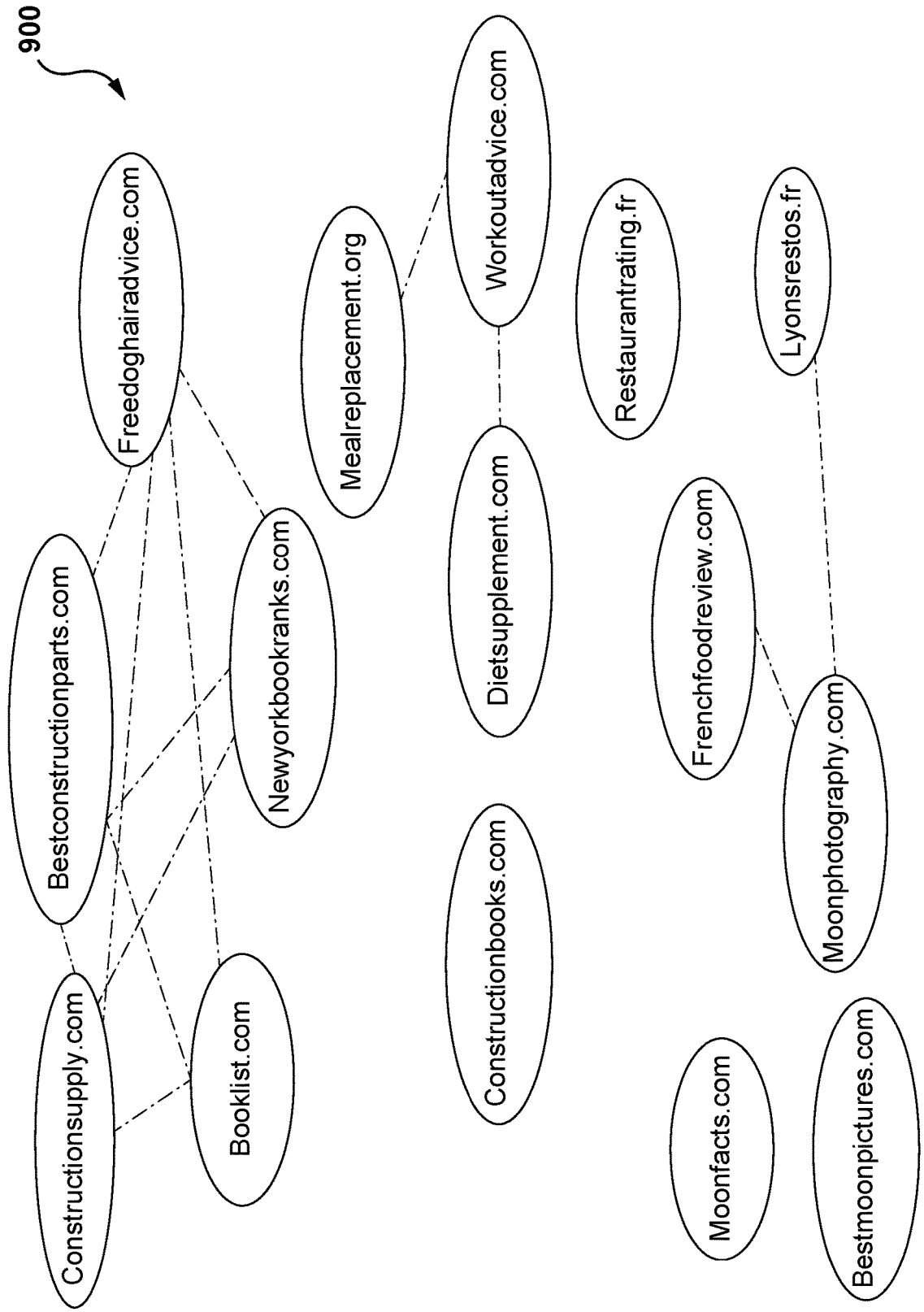
FIG. 9 depicts the graph of FIG. 8 after filtering in accordance with embodiments of the present technology.

At step 525 edges that connect two web hosts having same or similar themes may be removed from the graph. All edges in the graph connecting two web hosts having same or similar themes may be removed. For example, if Word2vec is used for determining themes, a vector may be determined for each of the web hosts. A cosine similarity between the vectors may be determined. If the cosine similarity satisfies a threshold cosine distance, such as a predetermined threshold cosine distance, the themes may be considered similar. The edges determined to have same or similar themes correspond to web hosts that have a natural affiliation. After removing these edges, any remaining edges in the graph will connect two web hosts that are non-naturally affiliated. FIG. 9, discussed in further detail below, illustrates a graph after removing edges that connect two nodes with related themes.

Instead of a graph, at step 510 lists of other web hosts visited by same UIDs may have been generated for each web host in the web search history. If lists of other web hosts were generated, at step 525 the other web hosts on the list having a related theme to the respective web host may be removed.

Step 530—Cluster Nodes Based on Edge Weights

Figure 10:
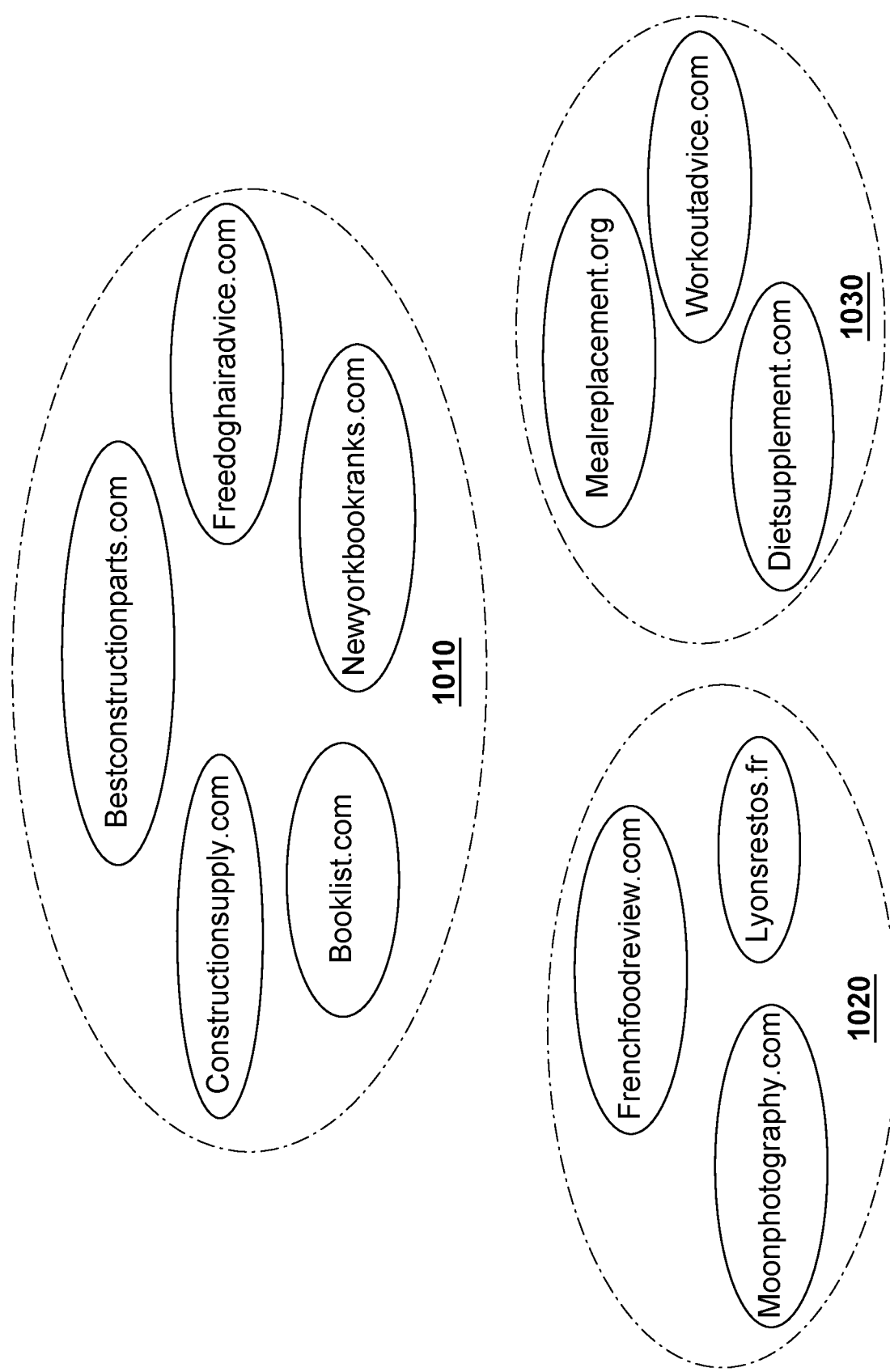
FIG. 10 depicts clusters formed using the graph of FIG. 9 in accordance with embodiments of the present technology.

At step 530 the nodes in the graph may be clustered. The clustering may be performed based on the edges and edge weights. Any clustering algorithm may be used, such as a k-spanning tree based algorithm, a minimum spanning tree based algorithm, a shared nearest neighbor based algorithm, and/or any other appropriate clustering algorithm. FIG. 10, described in further detail below, illustrates one example of clusters formed from a graph.

In some instances, nodes may be included in only a single cluster. In other instances, nodes may be included in multiple clusters. Some of the nodes might not be formed into a cluster with other nodes. For example if all edges were removed from a node at step 525, that node might not be included in any cluster. The nodes that are in a cluster by themselves may be removed from any further analysis.

Step 535—Retrieve User Interaction Data

At step 535 user interaction data may be retrieved. The retrieved user interaction data may correspond to web hosts in the clusters. The user interaction data may be filtered to limit the retrieved user interaction data to data corresponding to web hosts in the clusters. Queries may be used to retrieve user interaction data corresponding to the web hosts in the clusters.

The user interaction data may describe user behavior corresponding to the web hosts in the clusters. The user interaction data may comprise data from the query log 260, the user interaction log 265, data recorded by a web browser, data recorded by web scripts such as cookies, and/or other data describing user interactions with web hosts. The user interaction data may indicate which web hosts users visited, the activities performed by the users while visiting the web hosts, how the users browsed to the web hosts, and/or other web browsing history data.

The retrieved user interaction data may be bounded by a specified time period, such as user interaction data recorded within the past six months. The retrieved user interaction data may bounded by a geographic region, such as user interaction data corresponding to users in China.

Step 540—Select a First Cluster

At step 540 a first cluster of nodes is selected. Any of the clusters may be selected. The selection may be a random selection, an ordered selection, or any other suitable selection. For example, the largest cluster may be selected first.

Step 545—Determine Whether Hosts in the Selected Cluster are Affiliated

At step 545 the user interaction data may be analyzed to determine whether the hosts in the cluster are affiliated. Even though hosts in the cluster might not share related themes, user interaction data may indicate that a related group of users visited the web hosts in the cluster. If the user interaction data indicates that the web hosts in the cluster are affiliated, then the visits to the web hosts in the cluster are assumed to not be abnormal site visits.

To determine whether the web sites are affiliated by user interaction data, the user interaction data may be analyzed to determine whether a related group of users visited the web hosts in the cluster. For example, many users that are interested in golf might also be interested in boating. A cluster of web hosts may have been formed at step 530 where the cluster comprises web hosts related to golf and web hosts related to boating. Although web hosts related to golf and web hosts related to boating are not related thematically, the user interaction data may indicate that a significant portion of the users that browse golf-related web hosts also browse web hosts related to boating. In that case, the cluster may be determined to be affiliated by user interaction data.

The user interaction data analyzed at step 545 may be a data set describing the interactions of thousands of users, hundreds of thousands of users, or more. The size of the data set may be selected so that abnormal site visits are a relatively small portion of the user interaction data, such as less than five percent of the user interaction data.

Step 550—Remove Clusters With Affiliated Web Hosts

If the cluster is determined, at step 545, to contain web hosts that are affiliated based on user interaction data, then the cluster may be removed at step 550. Because the web hosts in the cluster are affiliated based on user interaction data, it is assumed that the web traffic shared between those web hosts is natural user activity, rather than abnormal site visits. If the traffic that caused a cluster to form is deemed natural, the web hosts in that cluster are not associated with abnormal site visits. The cluster may be removed from further consideration and/or an indicator may be stored that the cluster is not associated with abnormal site visits.

All or a portion of the cluster may be removed at step 550. For example, a web host that has not received abnormal site visits may be grouped into a cluster with other web hosts that have abnormal site visits. If it is determined that the web host did not receive abnormal site visits, that web host may be separated from the rest of the cluster. It is also possible that, after implementing the abnormal site visit identification system, a web host could be targeted with abnormal site visits in order to reduce the ranking of that web host in a SERP. If a web host is believed to be targeted in this manner, that web host may be removed from the cluster so that the abnormal site visits don't cause the ranking of the web host to fall.

Step 555—Determine Whether Any Clusters are Left for Analysis

After removing the cluster at step 550, or if the web hosts in the cluster were not determined to be affiliated based on user interaction data at step 545, a determination is made at step 555 whether there are any node clusters remaining to analyze. If all node clusters have been analyzed at step 545, then the method 500 proceeds to step 610, described below. If there is another cluster to analyze, the method 500 proceeds to step 560.

Step 560—Select a Next Cluster for Analysis

At step 560 a next node cluster is selected for analysis. Like at step 540, the node clusters may be selected in any order. The next node cluster selected is a node cluster that has not already been analyzed at step 545. After selecting the next cluster, the method 500 proceeds to step 545 and a determination is made as to whether the web hosts in the next cluster are affiliated.

Step 610—Store Indicator of Abnormal Site Visits for Web Hosts in Remaining Clusters After removing the clusters that are affiliated based on user interaction data at step 550, the remaining clusters are considered to be clusters of web hosts that received abnormal site visits. The web hosts in the remaining clusters have been filtered twice, first by determining whether the web hosts are naturally affiliated because they have similar themes at steps 520 and 525, and second by determining whether the web hosts are affiliated based on user interaction data. For the web hosts that have not been filtered out and remain at step 610, the visits to those webhosts were likely influenced by an external source, such as the search result fraud server 450. Users may have been paid to visit the web hosts in the remaining clusters. Various actions may be taken, such as the actions described at steps 610, 620, and 630, to counteract these abnormal site visits.

At step 610 an indicator may be stored for each of the web hosts in the remaining clusters. The web hosts may be marked as web hosts that have received abnormal site visits. The indicators may be stored in a database, such as in the index 255. UIDs associated with the abnormal site visits may be determined, and an indicator may be stored for each of those UIDs indicating that the UID is associated with abnormal site visits.

Step 620—Lower Search Rankings of Web Hosts in Remaining Clusters

Because the web hosts in the remaining clusters have received abnormal site visits, they may be ranked higher in SERPs than they otherwise would had they not received abnormal site visits. To correct for this, at step 610 the rankings of the web hosts in the remaining clusters may be lowered in SERPs, or those web hosts might not be included in SERPs.

When a SERP is being generated, the indicators stored at step 610 may be used to determine whether a web host has received abnormal site visits. If a web host was determined to have received abnormal site visits, the ranking of that web hosts in the SERP may be reduced, or the web host may be removed from the SERP.

Step 630—Remove Web Search History Data for Web Hosts in the Remaining Clusters

At step 630 web search history data and/or user interaction data corresponding to the abnormal site visits may be removed. In order to counteract the effects of abnormal site visits on search results, the activity associated with the abnormal site visits may be removed from any logs. Alternatively, rather than removing the activity, the activity may be marked as abnormal activity. By removing the activity associated with the abnormal site visits, results for SERPs may be generated that are not based on the abnormal site visits. UIDs associated with the abnormal site visits may be determined, and all activity relating to those UIDs may be removed from the logs. Finally, at step 640 the method 500 may terminate.

Now turning to FIGS. 7-10, diagrams of a non-limiting example of application of the method 500 are illustrated. FIG. 7 illustrates an example of a web search history 700. The web search history 700 is an example of a web search history that may be retrieved at step 505 of the method 500. In the web search history 700, each entry has a UID corresponding to the user that entered the search, the query that was entered by the user, and the web hosts selected by the user in the SERP. It should be understood that this web search history 700 is an example only, and that, as described above in regard to query log 260, other information may be included in the web search history 700.

As described above in regard to the method 500, a graph may be formed based on web search history. FIG. 8 illustrates a graph 800 formed using the web search history 700 illustrated in FIG. 7. Each web host in the web search history 700 is a node in the graph 800. The edges connecting the nodes indicate two web hosts that were visited by a same user. For example, as illustrated in the web search history 700, 'Newyorkbookranks.com' and 'Freedoghairadvice.com' were both visited by the UID '85592E.' Because these two web hosts were visited by a same user, they are connected by an edge in the graph 800.

As described at steps 520 and 525 of the method 500, edges between web hosts having related themes may be removed. FIG. 9 illustrates a filtered graph 900, in which the graph 800 has been filtered to remove edges connecting nodes with related themes. For example, in the graph 800, the hosts 'Booklist.com' and 'Constructionbooks.com' were connected by an edge. These web hosts both relate to the theme 'books.' Because these hosts have a related theme, in the graph 900 the edge connecting those hosts has been removed.

As described at step 530 of the method 500, nodes may be clustered based on edge weight to form node clusters. FIG. 10 illustrates clusters formed from the graph 900. Three clusters, clusters 1010, 1020, and 1030 were formed from the graph 900. Some of the nodes in the graph 900, such as the node for the web host 'Constructionbooks.com,' were not included in any of the clusters 1010, 1020, or 1030 because those nodes did not have any edges remaining in the graph 900.

As described at steps 535-560 of the method 500, the clusters may be filtered based on user interaction data. The cluster 1030 is an example of a cluster that might be filtered based on user interaction data. In the illustrated example, the web hosts 'Mealreplacementorg' and 'Workoutadvice.com' are not thematically related. But the user interaction data may indicate that users who visit 'Workoutadvice.com' also frequently visit 'Mealreplacementorg' and thus the web hosts are affiliated based on user interaction data. The cluster 1030 may then be removed because it can be assumed that the user activity related to those web hosts is not abnormal activity. The remaining clusters, clusters 1010 and 1020 may contain web hosts that received abnormal site visits. As described at steps 610-630 of the method 500, various steps, such as lowering search rankings, may be taken to counteract the abnormal site visits to those hosts.

As can be seen in FIGS. 7-10, two levels of filtering are performed on the web search history. First, edges that connect thematically-related web hosts may be removed. Then, user interaction data may be used to filter out clusters formed with web hosts that are related by user activity. It may be computationally less expensive to perform the first level of filtering, removing edges connecting thematically-related nodes, than performing the second level of filtering, removing clusters that are affiliated based on user interaction data.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be used as examples rather than limiting. The scope of the present technology is therefore intended to be limited solely by the scope of the appended claims.

The invention claimed is:

1. A method for determining web hosts receiving abnormal site visits, the method executable on a server, the method comprising:

retrieving web search history corresponding to a plurality of users;

generating a graph of the web search history, wherein each node in the graph is a web host in the web search history, wherein nodes are connected to other nodes via edges, each edge having an associated edge weight, and wherein the edge weight is determined based on an amount of users that visited both hosts connected by the edge;

clustering, based on the edge weights, the nodes in the graph, thereby forming a plurality of node clusters;

retrieving user interaction data corresponding to the node clusters, the user interaction data associated with the plurality of users having visited the web hosts associated with the node clusters;

determining, for each node cluster, whether web hosts in the respective cluster were affiliated based on the user interaction data;

removing, from the graph, each node cluster comprising web hosts that were affiliated based on the user interaction data; and storing, for each web host associated with a cluster remaining in the graph, an indicator that the respective web host is associated with abnormal site visits.

2. The method of claim 1, further comprising, before clustering the nodes in the graph:
determining, for each node in the graph, one or more themes corresponding to the respective node; and
removing, from the graph, edges connecting two nodes with associated themes.

3. The method of claim 2, wherein the determining the one or more themes for each node in the graph comprises querying a database for themes associated with a web host corresponding to the respective node.

4. The method of claim 1, further comprising:
receiving a search query;
generating, based on the search query, a search engine results page ranking a plurality of web hosts corresponding to the search query; and
reducing a rank in the search engine results page of a web host associated with abnormal site visits.

5. The method of claim 1, further comprising:
receiving a search query;
generating, based on the search query, a search engine results page ranking a plurality of web hosts corresponding to the search query; and
removing, from the search engine results page, a web host associated with abnormal site visits.

6. The method of claim 1, further comprising removing, from the web search history, data corresponding to web hosts associated with abnormal site visits.

7. The method of claim 1, further comprising:
determining a plurality of user identifiers corresponding to the abnormal site visits; and
storing, for each user identifier of the plurality of user identifiers, an indicator that the respective user identifier is associated with abnormal site visits.

8. The method of claim 1, wherein the user interaction data comprises the web search history.

9. The method of claim 1, wherein the user interaction data comprises web browser usage data.

10. The method of claim 1, wherein the user interaction data comprises web script data.

11. The method of claim 1, further comprising determining each edge weight based on a number of matching search queries entered by the users that visited both hosts connected by an edge.

12. A system for determining web hosts receiving abnormal site visits, the system comprising:
a processor; and
a non-transitory computer-readable medium comprising instructions,
the processor, upon executing the instructions, being configured to:
retrieve web search history corresponding to a plurality of users;
generate a graph of the web search history, wherein each node in the graph is a web host in the web search history, wherein nodes are connected to other nodes via edges, each edge having an associated edge weight, and wherein the edge weight is determined based on an amount of users that visited both hosts connected by the edge;
cluster, based on the edge weights, the nodes in the graph, thereby forming a plurality of node clusters;
retrieve user interaction data corresponding to the node clusters, the user interaction data associated with a plurality of users having visited the web hosts associated with the node clusters;
determine, for each node cluster, whether web hosts in the respective cluster were affiliated based on the user interaction data;
remove, from the graph, each node cluster comprising web hosts that were affiliated based on the user interaction data; and
store, for each web host associated with a cluster remaining in the graph, an indicator that the respective web host is associated with abnormal site visits.

13. The system of claim 12, wherein the processor, upon executing the instructions, is further configured to:
determine, for each node in the graph, one or more themes corresponding to the respective node; and
remove, from the graph, edges connecting two nodes with associated themes.

14. The system of claim 12, wherein the processor, upon executing the instructions, is further configured to:
receive a search query;
generate, based on the search query, a search engine results page ranking a plurality of web hosts corresponding to the search query; and
reduce a rank in the search engine results page of a web host associated with abnormal site visits.

15. The system of claim 12, wherein the processor, upon executing the instructions, is further configured to:
receive a search query;
generate, based on the search query, a search engine results page ranking a plurality of web hosts corresponding to the search query; and
remove, from the search engine results page, a web host associated with abnormal site visits.

16. The system of claim 12, wherein the processor, upon executing the instructions, is further configured to remove, from the web search history, data corresponding to web hosts associated with abnormal site visits.

17. The system of claim 12, wherein the processor, upon executing the instructions, is further configured to:
determine a plurality of user identifiers corresponding to the abnormal site visits; and
store, for each user identifier of the plurality of user identifiers, an indicator that the respective user identifier is associated with abnormal site visits.

18. The system of claim 12, wherein the processor, upon executing the instructions, is further configured to determine the edge weight based on a number of matching queries entered by the users that visited both web hosts connected by an edge.

19. A method for determining web hosts receiving abnormal site visits, the method executable on a server, the method comprising:
retrieving web search history corresponding to a plurality of users;
for each respective web host in the search history:
determining, based on the web search history, a list of other web hosts visited by users that visited the respective web host, and
removing, from the list of other web hosts, other web hosts having a natural affiliation with the respective web host;
clustering, based on the lists of other web hosts, web hosts that are non-naturally affiliated, thereby forming a plurality of clusters of web hosts;

retrieving user interaction data corresponding to the node clusters, the user interaction data associated with the plurality of users having visited the web hosts associated with the node clusters;

removing clusters comprising web hosts that are affiliated with each other based on the user interaction data; and storing, for each web host associated with remaining clusters, an indicator that the respective web host is associated with abnormal site visits.

20. The method of claim 19, wherein the removing the other web hosts having a natural affiliation with the respective web host comprises, for each other web host in the list of other web hosts, comparing one or more themes corresponding to the respective web host to one or more themes corresponding to the respective other web host.

* * * * *